US010182373B2

(12) United States Patent
Bouvet

(10) Patent No.: US 10,182,373 B2
(45) Date of Patent: Jan. 15, 2019

(54) METHOD FOR CONTROLLING A PHONE CALL INITIATED BY A TERMINAL CONNECTED TO A COMMUNICATIONS NETWORK

(71) Applicant: Orange, Paris (FR)

(72) Inventor: Bertrand Bouvet, Perros Guirec (FR)

(73) Assignee: ORANGE, Paris (FR)

( * ) Notice: Subject to any disclaimer, the term of this patent is extended or adjusted under 35 U.S.C. 154(b) by 0 days.

(21) Appl. No.: 15/536,587

(22) PCT Filed: Dec. 9, 2015

(86) PCT No.: PCT/FR2015/053385
§ 371 (c)(1),
(2) Date: Jun. 15, 2017

(87) PCT Pub. No.: WO2016/097533
PCT Pub. Date: Jun. 23, 2016

(65) Prior Publication Data
US 2017/0332281 A1 Nov. 16, 2017

(30) Foreign Application Priority Data

Dec. 16, 2014 (FR) ...................................... 14 62553

(51) Int. Cl.
*H04M 3/42* (2006.01)
*H04W 28/18* (2009.01)
*H04W 76/10* (2018.01)

(52) U.S. Cl.
CPC ........... *H04W 28/18* (2013.01); *H04W 76/10* (2018.02)

(58) Field of Classification Search
CPC .......... H04W 4/02; H04W 4/16; H04W 8/18; H04W 8/12; H04W 8/04; H04W 8/06
(Continued)

(56) References Cited

U.S. PATENT DOCUMENTS

2010/0303060 A1 12/2010 Goncalves et al.
2011/0021202 A1* 1/2011 Rosen ................. H04W 72/087
455/450
(Continued)

FOREIGN PATENT DOCUMENTS

WO WO 2007/001143 1/2007

OTHER PUBLICATIONS

International Search Report and Written Opinion dated Mar. 21, 2016 for Application No. PCT/FR2015/053385.
(Continued)

*Primary Examiner* — Temica M Beamer
(74) *Attorney, Agent, or Firm* — Knobbe, Martens, Olson & Bear, LLP

(57) ABSTRACT

A method for controlling a phone call initiated by a first communication terminal connected to a communications network via a server of an operator network is disclosed. The method includes receiving a request to set up a phone call between the first terminal and a second terminal, the request comprising an identifier of the first terminal, an identifier of the second terminal and at least one parameter describing said phone call. The method also includes determining whether a degraded communication mode should be activated by querying a database of identifiers according to the identifier of the first terminal and the identifier of the second terminal. If the degraded communication mode is activated, the method also includes modifying the initial descriptive parameter, and transmitting the modified descriptive parameter to a management server of the operator network, the modified descriptive parameter representing degraded call quality relative to the initial descriptive parameter.

13 Claims, 5 Drawing Sheets

(58) Field of Classification Search
USPC .................. 455/414.1, 433, 435.1, 415, 417
See application file for complete search history.

(56) References Cited

U.S. PATENT DOCUMENTS

| | | |
|---|---|---|
| 2012/0002540 A1 | 1/2012 | Siddam et al. |
| 2014/0254484 A1 | 9/2014 | Castro Castro et al. |
| 2015/0304990 A1* | 10/2015 | Manpuria ............. H04W 76/18 370/329 |

OTHER PUBLICATIONS

Preliminary Search Report dated Oct. 8, 2015 for French Application No. FR 1462553.
Kanada, Policy-based End-to-End QoS Guarantee Using On-Path Signaling for Both QoS Request and Feedback, International Conference on Information Networking, 2008, pp. 1-5.

* cited by examiner

METHOD FOR CONTROLLING A PHONE CALL INITIATED BY A TERMINAL CONNECTED TO A COMMUNICATIONS NETWORK

RELATED APPLICATIONS

This application is the U.S. National Phase of Application No. PCT/FR2015/053385 entitled "METHOD FOR CONTROLLING A PHONE CALL INITIATED BY A TERMINAL CONNECTED TO A COMMUNICATIONS NETWORK" filed Dec. 9, 2015, which designated the United States, and which claims the benefit of French Application No. 1462553 filed Dec. 16, 2014.

GENERAL TECHNICAL FIELD

The present invention relates to the field of phone calls.
More precisely, it relates to a method for controlling a phone call initiated by a first terminal

PRIOR ART

The tariff offers of the telecommunications services offered by communications network operators or communications service providers are constantly changing, with a general trend toward services paid for at a flat rate. For example, services of this type are offered to users for VoIP (Voice Over IP) fixed telephony. For these services, the fixed destinations in France (such as the standard-rate numbers beginning with 01, 02, 03, 04, 05, 087 or 09) and mobile destinations in France (such as the numbers beginning with 06 or 07) generally form part of the flat-rate sum paid by the user subscribing with the operator or service provider. Generally speaking, there is no real-time monitoring for these standard called numbers.

Conversely, destination numbers for value-added services (i.e. premium-rate telephony services, also referred to as Audiotel) to France or to international destinations often do not form part of the flat-rate sum. Calls made to premium-rate numbers of this type are monitored via an "intelligent" network. An antifraud server of the intelligent network is activated when a fixed switch of the communications network detects that the called number belongs to a group of French or international premium-rate numbers. The call signaling is transmitted to the antifraud server which determines, on the basis of the calling number and the called number, whether or not the call can be routed.

If this involves the first call of the same calling number to a premium-rate called number, the call is authorized by the antifraud server and the call signaling is transmitted to the destination associated with the premium-rate number, the premium-rate call counter for the customer being incremented in terms of either the number of calls or the call duration. Conversely, if a premium-rate call limit is reached in a given period, the call request is rejected and a voice message can be broadcast to the caller to inform him that he has exceeded the authorized quota, or the call is immediately rejected. When the call limiter calculation period has elapsed, for example every 24 hours, the information present in the database of the antifraud server is re-initialized in order to authorize the premium-rate number calls to each of the customers.

The antifraud server clearly has limited capacities and this system is therefore effective for a limited number of destinations (in the specific case of the groups of premium-rate numbers in France and to international destinations). It would not be necessary for all calls to be routed through this antifraud server, without which it would be necessary to re-dimension the links between the switches and the servers of the intelligent network. Moreover, it should be noted that the algorithm of the antifraud server is simple: the outgoing call is either authorized or rejected.

However, a binary mechanism of this type is limiting. In fact, the flat-rate tariffs are constantly changing. For example, on the fixed VoIP network, as well as the standard VoIP flat-rate charges, additional paid flat-rate charges are proposed for certain target destinations. For example, additional paid flat-rate charges of this type allow a user to benefit from unlimited VoIP call offers from France to the target destination.

However, with a service offer of this type, some ill-intentioned users may attempt to defraud the service offer, for example by abusing the offered service or offering the use of the service to other persons outside the household of the user subscribing to the service.

With the conventional flat-rate billing system and the constraints of the antifraud server (activation on certain called numbers only), the fraud may be difficult to control.

It is possible to configure the activation of the antifraud server for some targeted international prefixes and to configure rules such as a maximum of five calls per day (with a maximum duration of 8 hours per call). However, such rules do not allow an effective monitoring from the point of view of the subscribing user, since some subscribing users will, for example, attach greater importance to the maximum number of authorized calls per day than to the total duration of the calls. Furthermore, given the large number of possible international destinations, it is not possible to monitor all international numbers via this mechanism.

The same problem arises with unlimited mobile VoIP call service offers.

For this reason, it seems appropriate to create a new, more sophisticated (audio or videophone) VoIP call filtering system in order to limit potential fraud on the one hand, and, on the other hand, to meet the requirements of the commercial offer of unlimited calls. The same principle must be applicable to the fixed network and to the mobile network.

Document US20120002540A1 describes a method for authorizing and calculating a quality of service at a PCRF node in response to receiving a service request for a subscriber having a requested quality of service.

Document US20140254484A1 describes a communication session with a required quality of service via an IMS server between a first and a second user. When the first user does not have a sufficient QoS, the method allows the first user to borrow an additional QoS from the second user if the second user authorizes it and if it has a sufficient QoS.

PRESENTATION OF THE INVENTION

The present invention thus relates, according to a first aspect, to a method for controlling a phone call initiated by a first terminal connected to a communications network via an operator network, the method including the implementation by a server of the operator network of steps of:
  (a) receiving a request to set up a phone call between the first terminal and a second terminal, said request including an identifier of the first terminal, an identifier of the second terminal and at least one initial descriptive parameter of said phone call;
  (b) interrogating an identifier database according to the identifier of the first terminal and the identifier of the second terminal in such a way as to determine whether a degraded call mode must be activated;

(c) if the degraded call mode is activated,
modifying the initial descriptive parameter,
transmitting a message to a management server of the operator network, said message including the modified descriptive parameter and being intended to set up the phone call via the communications network, the modified descriptive parameter representing a degraded call quality compared with the initial descriptive parameter.

A phone call is understood here and in the description below to mean an audio or videophone call.

By means of the method according to the invention, it is possible to implement an intermediate degraded mode, compared with the preceding binary mode. This mode enables the implementation of a universal, practical and efficient "fair use" system. A method of this type can be implemented for a phone call to be set up via a fixed communications network or via a mobile communications network.

The method according to the invention can be carried out by an application server of the operator network or by a call quality management server (referred to as PCRF for Policy and Charging Control Function in English) of the operator network.

Furthermore, when the method is implemented on a fixed communications network, according to one particular embodiment of the invention, the present method can be implemented by the antifraud server. In this case, an implementation of this type requires only a software modification in the existing telephony application server and allows the antifraud server and all the other equipment of the operator network to be reused.

When the method is implemented on a mobile communications network, it offers a simple solution to be implemented in order to control the calls set up via the mobile communications network.

When it is implemented by an application server of the operator network, the method according to the invention allows not only the calls set up via the fixed communications network but also the calls set up via the mobile communications network to be controlled.

All the constraints of the prior art are thus overcome.

According to one particular embodiment, the request to set up a phone call is a request to reserve resources in order to set up the call between the first terminal and the second terminal.

According to a different particular embodiment of the invention, the request to set up a phone call is a request to set up a phone call transmitted by the first terminal.

According to other advantageous and non-limiting characteristics:

step (b) is implemented only if the identifier of the second terminal belongs to a list of called identifiers to be monitored of the application server;

the degraded mode is implemented only if a call threshold associated with the identifier of the first terminal in said identifier database is reached;

said identifier database is that of a verification server, step (b) including:
transmitting an auxiliary request intended for the verification server, said request including the identifier of the first terminal and the identifier of the second terminal, and
receiving a response to said auxiliary request indicating whether the degraded call mode must be activated.

the communications network is a circuit network, and the operator network is an IMS (IP Multimedia Subsystem) network;

the verification server is connected to the telephony application server via an interface chosen from IM-SSF (IP Multimedia Service Switching Function), LDAP (Lightweight Directory Access Protocol), HTTP (Hyper Text Transfer Protocol) and DIAMETER;

said descriptive parameter adheres to the SDP (Session Description Protocol) format;

said initial descriptive parameter represents an audio and/or video codec for the implementation of the audio or videophone call; the modified descriptive parameter representing an audio or video codec offering a quality inferior to that of the initial audio or video codec, the initial descriptive parameter represents the G.711 or G.722 audio codec, the modified descriptive parameter representing the G.729 audio codec;

the initial descriptive parameter represents the H264 video codec, the modified descriptive parameter representing the H263 video codec;

said descriptive parameter represents a frame length;

said modified descriptive parameter represents an activated "silence detector" mode;

said modified descriptive parameter represents an activated "half-duplex" mode;

said modified descriptive parameter designates a media server via which the call must be routed, the media server being configured to apply at least one processing operation degrading the call.

According to a second aspect, the invention relates to a server of an operator network for controlling a phone call initiated by a first terminal connected to a communications network via the operator network, the server being characterized in that it includes a data processing module configured to:

receive a request to set up a phone call between the first terminal (1a) and a second terminal (1b), said request including at least an identifier of the first terminal (1a), an identifier of the second terminal (1b) and at least one initial descriptive parameter of said phone call;

interrogate an identifier database according to the identifier of the first terminal (1a) and the identifier of the second terminal (1b) and determine whether a degraded call mode must be activated;

If the degraded call mode is activated,
modify the initial descriptive parameter,
transmit a message to a management server (P-CSCF) of the operator network (21), said message including the modified descriptive parameter and being intended to set up the phone call via the communications network (20) or to modify the phone call in progress between the first terminal and the second terminal, the modified descriptive parameter representing a degraded call quality compared with the initial descriptive parameter.

Given its position in the operator network, a server of this type enables a simple implementation of this method.

According to advantageous and non-limiting characteristics, the server furthermore includes a data storage module storing said identifier database. Alternatively, the identifier database is included in a verification server, for example the antifraud server.

The invention also relates to a management server of an operator network, including a data processing module configured to:

receive a message including a modified descriptive parameter originating from a server of the operator network, the modified descriptive parameter representing a degraded call quality compared with the initial descriptive parameter included in a request to set up a call between a first terminal (1a) and a second terminal (1b), transmit to at least the second terminal (1b) a request to set up the call or a request to modify the call in progress between the first terminal and the second terminal, said set-up request or modification request including said modified descriptive parameter.

According to a third and a fourth aspect, the invention relates respectively to a computer program product including code instructions to carry out a method according to the second aspect of the invention for controlling a phone call initiated by a first terminal connected to a communications network via an operator network; and a computer-readable storage medium on which a computer program product includes code instructions to carry out a method for the implementation of a method according to the second aspect of the invention for controlling a phone call initiated by a first terminal connected to a communications network via an operator network.

PRESENTATION OF THE FIGURES

Other characteristics and advantages of the present invention will become evident from a reading of the following description of a preferred embodiment. This description will be given with reference to the attached drawings, in which.

DETAILED DESCRIPTION

Network Architecture

Figure 1A:
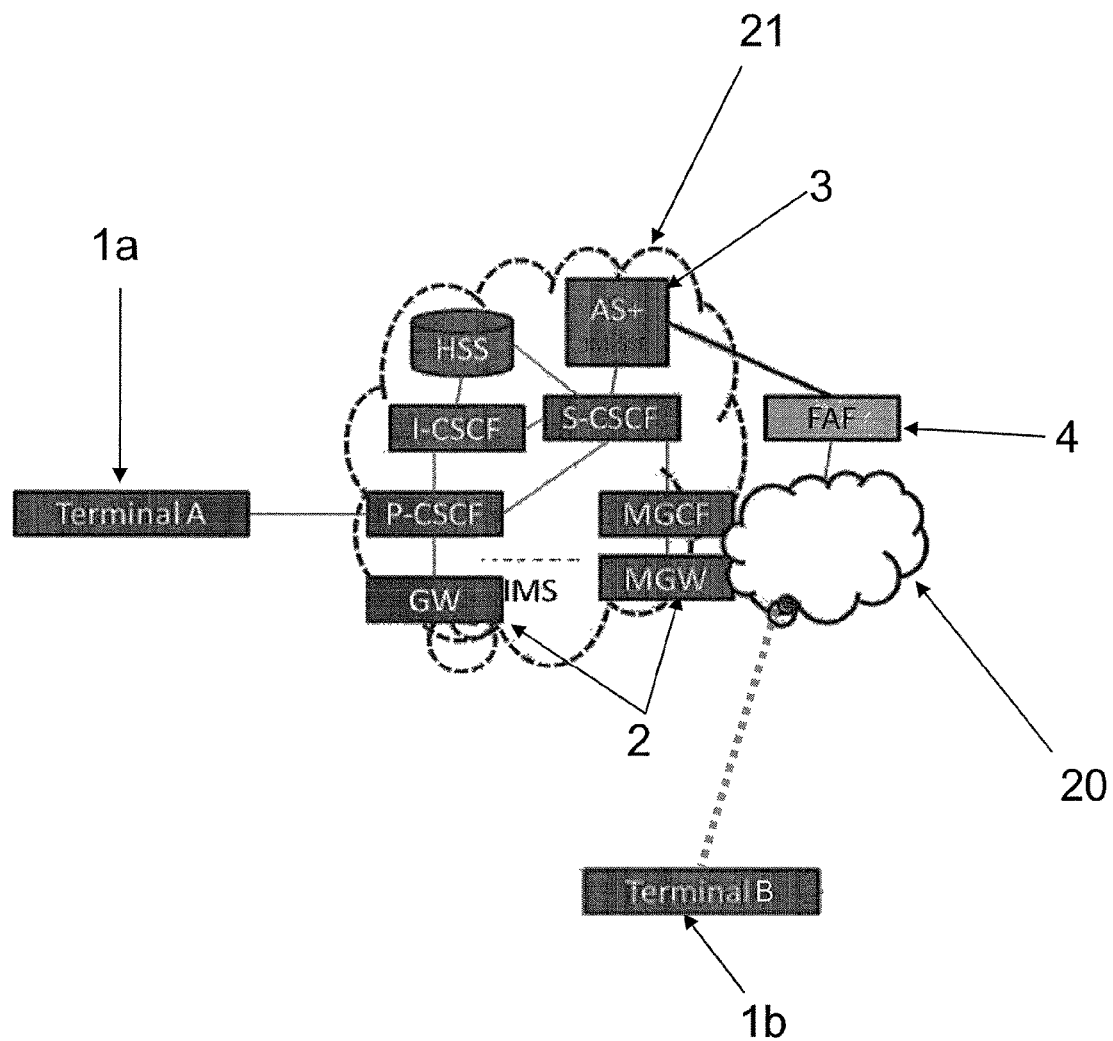
FIGS. 1a and 1b show two network architectures for carrying out a method according to the invention.

With reference to FIG. 1a, the invention proposes a method for controlling a phone call initiated by a first terminal 1a connected to a communications network 20 via an operator network 21. A phone call of this type may be an audio or videophone call; the call is intended for a second terminal 1b. The call thus includes at least one audio stream. In the case of a videophone call, the call includes an audio stream and a video stream.

The present method is not limited to any type of terminal 1a, 1b, and the latter may be any equipment (such as a fixed telephone, a computer, a mobile terminal, a voice server, etc.) which is connected to a communications network 20 and supporting the generation and restoration of an audio and possibly a video stream, in other words which includes an audio input (typically a microphone) and an audio output (typically a loudspeaker). A terminal of this type also optionally includes an input capable of capturing a video stream, such as a camera, and an output capable of restoring a video stream, such as a screen. It will be understood that the first terminal 1a may become a second terminal 1b and vice versa, according to the calls transmitted on the network 20.

It will be noted that, according to one particular embodiment of the invention, the second terminal 1b is more particularly a server of a premium-rate telephony service, its audio input and output therefore being virtual.

The communication network 20 designates, in particular, the Internet network and/or conventional telephony "circuit" (non-VoIP) networks, typically PSTN ("Public Switched Telephone Network") or 2G/3G GSM. The present description will continue with a discussion of the example in which the network 20 is the circuit network.

The operator network 21 is a communications network enabling the transmission of VoIP communications. For example, the operator network 21 is a network core according to the IMS ("IP Multimedia Subsystem") architecture. An IMS operator network 21 interworks with all types of (fixed or mobile) networks via gateways 2, and includes packet-switching functions (such as 3G UMTS, 4G LTE, xDSL, etc.). Older circuit-switching systems are thus supported.

In the preferred example shown in FIG. 1a (case of fixed VoIP implemented according to the SIP protocol "Session Initiation Protocol"), the first terminal 1a is connected to an operator network device 21, referred to as P-CSCF ("Proxy Call State Control Function"). A device of this type controls a gateway GW enabling the processing and/or switching of the media streams.

The P-CSCF is connected to an I-CSCF ("Interrogating Call State Control Function") allowing an HSS ("Home Subscriber System") database of profiles associated with the terminals 1a, 1b for the allocation of an S-CSCF ("Serving Call State Control Function") device. An S-CSCF device of this type is used to register the first terminal 1a in the core of the operator network 21.

When the communications network 20 is a circuit network, the calls intended for non-VoIP numbers are routed toward the communications network 20 via a signaling and circuit media gateway 2 (more precisely an MGW gateway ("Media Gateway") associated with an MGCF ("Media Gateway Control Function") server to which the S-CSCF is also connected).

Finally, the S-CSCF is connected to a telephony application server 3 (referred to as AS) in order to perform services, typically outgoing or incoming ("originating/terminating") call filtering services, hiding or showing the calling number A, etc.

Figure 1B:
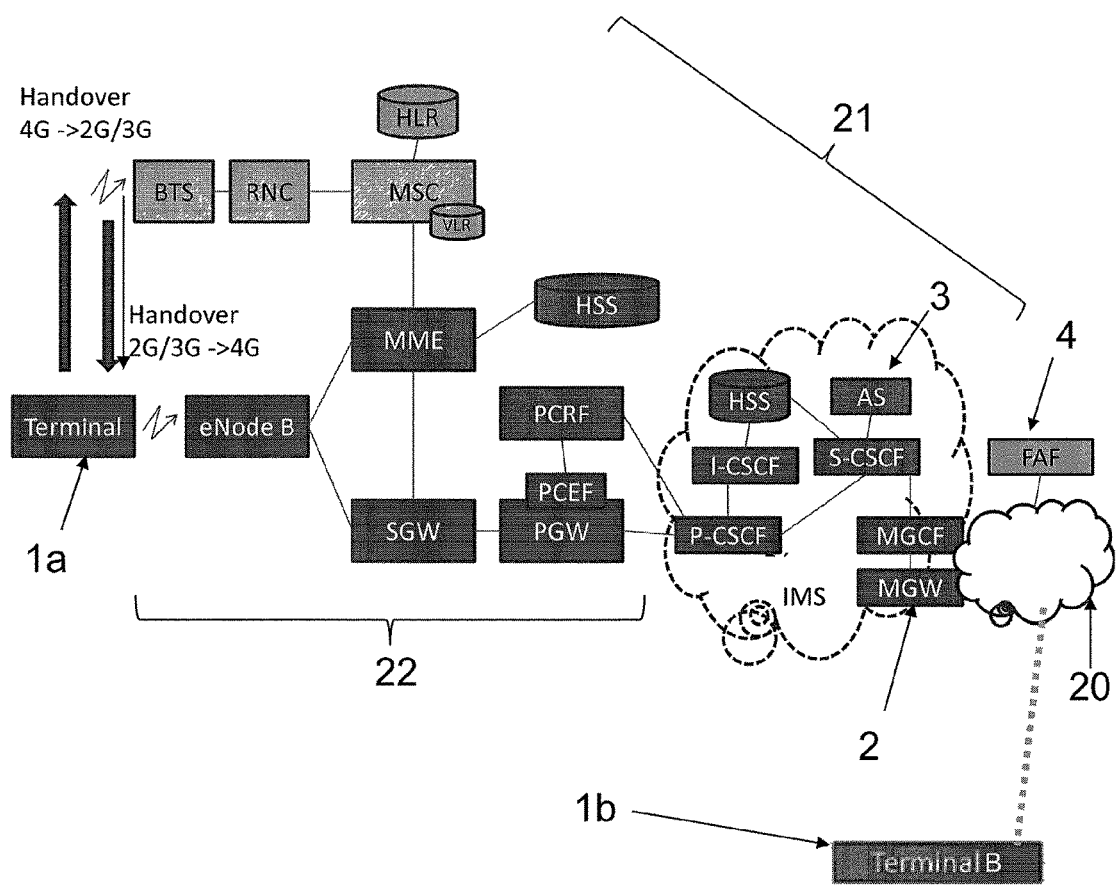

In a case where the first terminal 1a is a mobile terminal, the operator network 21 encompasses a mobile communications network 22 as shown in FIG. 1b.

When the mobile communications network 22 is a 4G mobile network offering VoIP communications services, referred to in this case as VoLTE (for Voice over Long Term Evolution), the quality of service QoS (for Quality of Service) for accessing a call is guaranteed by normalized 3GPP mechanisms.

In a 2G/3G mobile network (upper part of the network 22 in FIG. 1b), in a known manner, the first terminal 1a connects via mobile radio to an antenna BTS which is controlled by an RNC ("Radio Network Controller") device. The RNC is connected to the mobile telephony switch MSC ("Mobile Switch Center") which integrates a local VLR ("Visited Location Registration") database responsible for storing the profile of the subscriber to the service, managing the location of the terminal, etc.

The HLR ("Home Local Registration") database is the central database which contains the profile of all users and the location of their terminal.

In a 4G network (lower part of the network 22 in FIG. 1b), in a manner also known, the first terminal 1a connects to the eNodeB antenna which is connected to an MME ("Mobility Management Entity") device which is itself connected to the HSS EPC ("Evolved Packet Core") database, equivalent to the HLR but for 4G requirements. The MME is also connected to the SGW ("Serving Gateway") which is connected to the PGW ("PDN Gateway", where PDN designates a "Packet Data Network"). The signaling streams linked to the mobile management (attachment, provision of location information, etc.) is routed from the first terminal 1a to the eNodeB then to the MME.

The application streams such as the VoIP streams (call and media signaling) are routed from the first terminal 1a to the eNodeB, then the SGW and PGW (via GTP tunnels ("GPRS Tunnel Protocol")) then return to the IMS core of the operator network 21 made up of the P-CSCF, I-CSCF, S-CSCF, AS, and MGCF+MGW servers as previously described.

The first node of the IMS P-CSCF network processing the SIP signaling is interfaced with a PCRF ("Policy and Charging Rules Function") device which is itself interfaced with a PCEF ("Policy and Charging Enforcement Function") device. These PCRF and PCEF devices are responsible for reserving the resources upstream in the mobile network (in the radio interface in particular) when a real-time audio or videophone call is set up.

The present method is obviously not limited to the embodiments shown in FIGS. 1a and 1b and applies to any type of architecture in which a first terminal 1a is connected to a communications network 20 via an operator network 21.

Principle of the Invention

The invention proposes a method for controlling a phone call in which the quality of the phone call may be degraded when a criterion for activating the degradation of the phone call is activated. The known technique consisting in reducing the transfer rate authorized for the transmission of the data streams ("data") on a (2G/3G/4G) IP mobile network cannot be used here.

The data part (referred to as "service data") is in fact monitored for each of the customers via the PCC ("Policy and Charging Control") function. Thus, when a mobile subscription is proposed with, for example, 3 Gigabytes of "data", the PCC monitors the data consumption in real time, for example by allocating micro-credits of 10 or 100 Megabytes until the 3 Gigabytes are consumed. When the subscribing user has consumed the 3 Gigabytes of his subscription, the data streams transmitted or received by the terminal of the user may undergo degradations. For example, the data stream may be blocked or the data stream transmission bandwidth may be very substantially reduced. A reduction of this type thus allows the user to be offered access to some services, such as emails without attachments, but not to other services requiring a higher bandwidth, such as video downloads.

An operation of this type cannot be applied to a fixed or mobile phone call.

In fact, the parameters of a phone call on a fixed network operating in circuit mode cannot be modified. A single G.711 codec is used for voice with a constant transmission rate of 64 kbit/s.

For a call in VoIP mode, the VoIP communication networks interconnect directly in VoIP mode in such a way as to optimize costs, wherein the verification server 4 can no longer be activated.

Moreover, a degradation of the phone call must take account of the constraint according to which, although the phone call has a degraded quality, the degraded phone call must remain audible or visible in the case of a videophone call. Any arbitrary degradation of the call is therefore not possible, in particular the substantial reduction in the transmission rate, without taking account of the audible or visible aspect of the call or the blocking of the audio or video data streams of the phone call. Furthermore, although degraded, the phone call must nevertheless meet real-time or near-real-time requirements. A constraint of this type is not always observed in the event of a substantial reduction in the transmission rate.

In the present method, this difficulty is overcome since the verification server 4 may be:
either activated directly in VoIP through the integration into the telephony application server 3 AS of a new interface visible in FIG. 1a, for example an LDAP ("Lightweight Directory Access Protocol") interface, or an HTTP ("Hyper Text Transfer Protocol") interface, or an interface according to the DIAMETER protocol (an authentication protocol, successor to the RADIUS protocol), or using an INAP protocol through the addition of an IM-SSF function ("IP Multimedia Service Switching Function"), which allows access to intelligent network services (in circuit mode) from the communication network IMS, i.e. directly from the operator network 21; or integrated into the application server 3 AS.

Figure 3A:
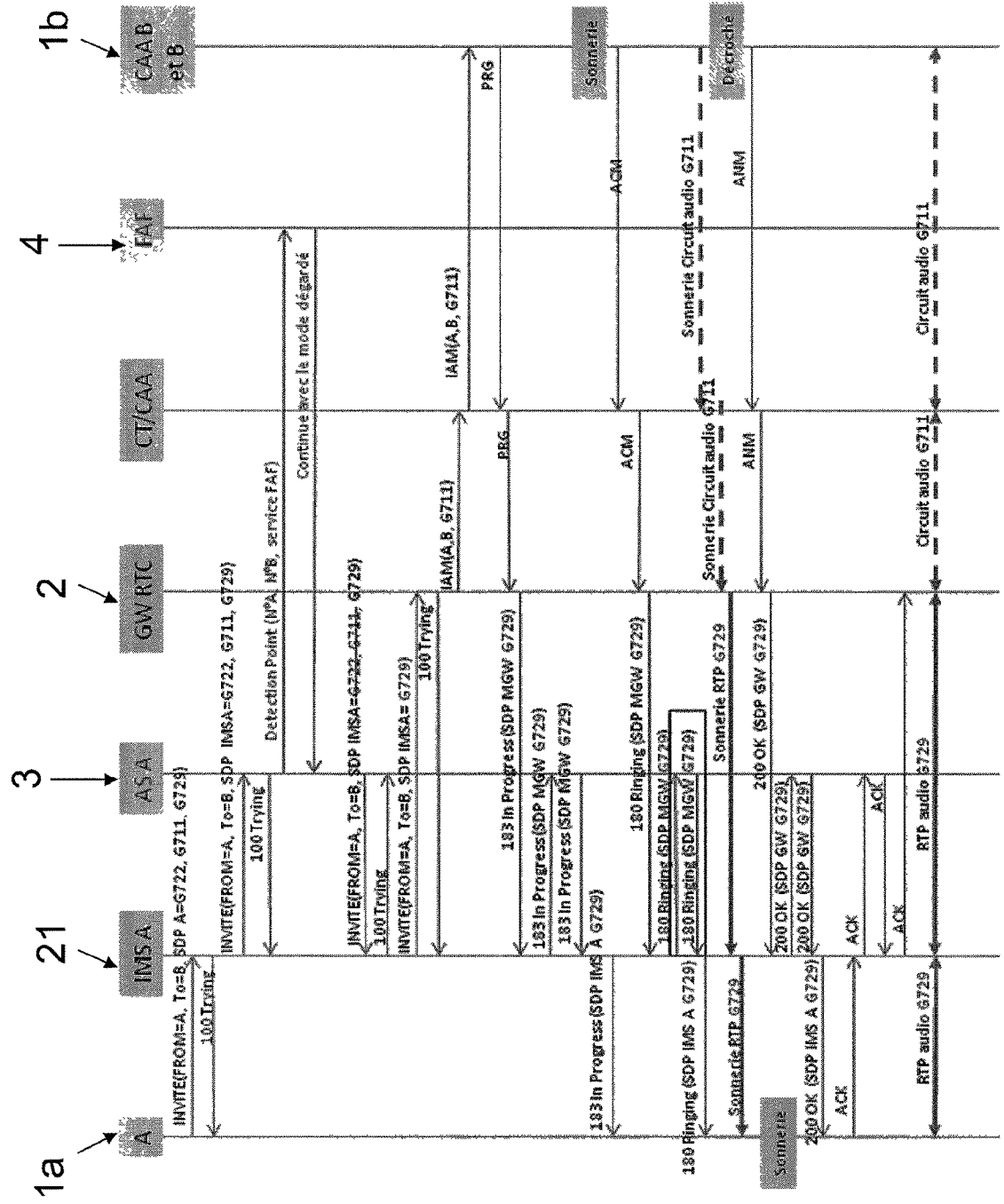
FIGS. 3a-3b are two flowcharts showing the processing of "at-risk" calls according to two embodiments of the method according to the invention.
Figure 3B:
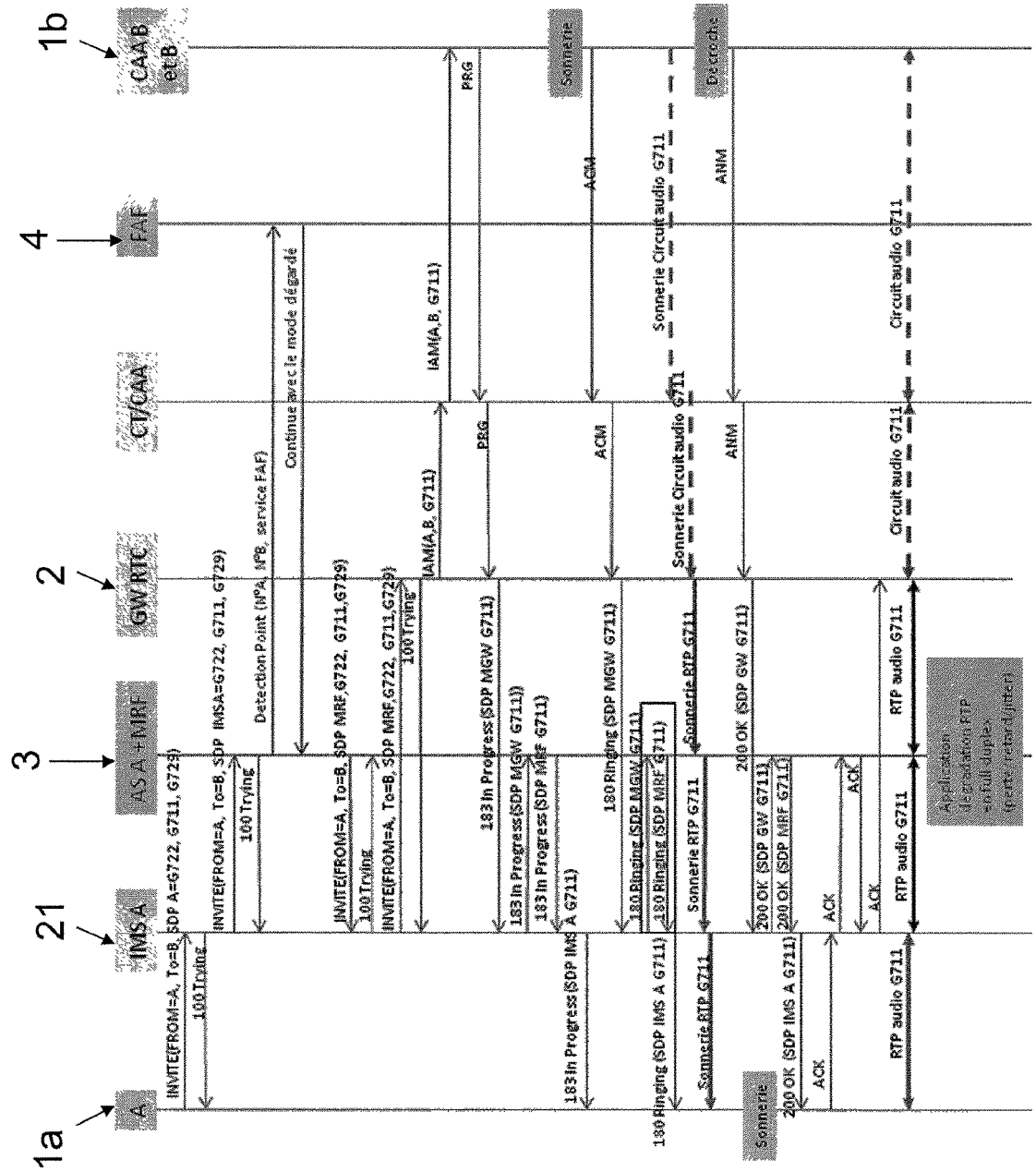

With reference to FIGS. 3a and 3b, which describe two alternative embodiments, the present method thus begins with a step (a) of reception by the application server 3 AS (typically via an S-CSCF of the operator network 21) of a request (in particular the SIP INVITE message) to set up a phone call between the first terminal 1a and the second terminal 1b, said request including an identifier of the first terminal 1a, an identifier of the second terminal 1b and at least one descriptive parameter of said phone call. It should be noted that the application server 3 AS still receives the requests to set up a call in the case where telephony services must be implemented during the call set-up.

The descriptive parameter included in the request to set up the phone call represents a call quality factor. In a preferred manner (example shown in FIG. 3a), a representative parameter of this type corresponds to a codec for implementing the phone call. In fact, it is known to include a group of parameters, referred to as the "SDP offer" (for "Session Description Protocol"), used to initialize the call, in an SIP INVITE message. An SDP offer of this type traditionally includes the codecs supported by the first terminal 1a (for example the G.722 wideband codec, the G.711 standard circuit mode codec, and an inferior-quality codec in order to optimize the G.729 bandwidth). Other desirable parameters will be described below.

In a second original step (b), the server 3 AS interrogates an identifier database according to the identifiers of the first and second terminals 1a, 1b. An identifier database of this type contains, in particular, counters associated with each terminal 1a, 1b. The interrogation by the server 3 AS determines whether a degraded call mode must be activated for the phone call that is to be set up.

According to one particular embodiment of the invention, said identifier database is included in the verification server 4, and step (b) includes:
transmitting an auxiliary request to the verification server 4, said request including the identifier of the first terminal 1a and the identifier of the second terminal 1b, wherein an auxiliary request of this type corresponds, for example, to the first request to set up the call transmitted by the terminal 1a, and
receiving a response to said auxiliary request, indicating whether the degraded call mode must be activated.

In other words, in contrast to the procedure above, it is the application server 3 AS which directly interrogates the verification server 4 and thus receives its response (instead of a switch CT).

According to one particular embodiment of the invention, the application server 3 which first receives all the requests to set up a call, in the form of SIP INVITE messages, is configured to determine whether the calling number is in a list of numbers to be monitored and, if so, to report this to the verification server 4. In other words, the degraded mode can be implemented only if the identifier of the second terminal 1b belongs in said identifier database to a list of called identifiers to be monitored.

During step (b), the server 4 checks whether the call threshold associated with the calling number is reached. If a call threshold associated with the identifier of the first terminal 1a in said identifier database is reached, an alert is triggered in the server 4. An alert of this type is processed here as an activation of a degraded mode and not a simple call blocking.

Alternatively, the verification server 4 is integrated into the application server 3, including the database, and all of step (b) takes place within this latter server 3.

Then, if the degraded call mode is activated, the method includes a step (c) of modifying the descriptive parameter in said request to set up a call. The modified descriptive parameter is chosen to represent a degraded call quality compared with the initial descriptive parameter, in such a way as to allow the degradation of the quality of the call.

The modified request is then retransmitted in the operator network 21 (typically from which it comes, i.e. the S-CSCF) in order to set up the phone call via the network 20. According to the invention, the application server 3 intercepts and modifies the request to set up a call in a manner that is transparent to the equipment of the operator network 21, which it is thus not necessary to modify.

The term "limitation" of the call is used, since said call does in fact take place, unlike the prior art where the call was refused, but in a manner which is incomplete and unpleasant for the user.

Descriptive Parameters

In the example shown in FIG. 3a, the server 3 AS removes the G.722 wideband and G.711 narrowband codecs, and leaves only the G.729 codec in the SDP offer. A G.729 codec of this type provides a very high compression rate and therefore an inferior quality. The initial descriptive parameter represents the G.711, G.722 or G.729 codec and the modified descriptive parameter represents the G.729 codec. Thus, if the second terminal 1b is also on a VoIP network, it will only be able to accept the call with the inferior-quality G.729 codec. If the second terminal 1b is on a circuit network, the MGCF will control the MGW so that it uses the G.729 codec on the side of the first terminal 1a, and, by necessity, the G.711 codec on the side of the second terminal 1b. Consequently, the call will ultimately be made up of a media section coded according to the G.729 codec between the first terminal 1a and the MGW, then a media section coded according to the G.711 codec between the MGW and the second terminal 1b. The quality will therefore be degraded for the calling terminal and the called terminal since the end-to-end media sequence will be as follows: G.729 coding in the first terminal 1a, G.729 decoding in the MGW, then recoding in G.711 in the MGW of a signal already deteriorated in G.729, then G.711 decoding by the telephony switch of the call.

Alternatively or additionally (a plurality of descriptive parameters may obviously be involved simultaneously in a more substantial degradation in quality), said descriptive parameter represents a frame length ("ptime" parameter). The modified parameter thus represents, for example, 40/60/80/100 ms frames instead of the 20 ms default, thus adding delays and therefore influencing interactivity.

Further alternatively or additionally, said modified descriptive parameter represents an activated "silence detector" mode. The activation of the VAD ("Voice Activation Detection") silence detector in the SDP offer disengages the forwarding of voice over IP packets when there are silences, whereby, when the communicating party speaks again, the first syllables are lost during the time when the detector detects the breaking of the silence.

Further alternatively or additionally, said modified descriptive parameter represents an activated "half-duplex" mode (i.e. one-way communication). According to this variant, the initial parameter represents a "full-duplex" mode, i.e. two-way communication. The parameter is changed from "sendrecV" to "sendonly" or "recvonly". Consequently, the telephony service is de facto unusable, since the user cannot talk and listen at the same time. The call could also be ended by the server AS 3 after a few seconds in order to disrupt communication.

In a second embodiment shown in FIG. 3b, said modified descriptive parameter designates a media server via which the call must be routed, typically an MRF ("Media Resource Function") of the operator network 21 IMS. The application server 3 thus forces the media streams to be routed toward this media server MRF. According to this particular embodiment of the invention, the media server MRF is controlled by the application server 3 in such a way that the media server MRF applies degradation processing operations to the media streams. Degradation processing operations of this type are, for example:

Application of more or less substantial random delay of the IP packets transporting the media stream, thereby considerably interfering with the quality of the call;

Application of an RTP media packet loss percentage algorithm (>1%), thereby considerably interfering with the quality of the call;

Application of a jitter application algorithm (jitter being the phenomenon of fluctuation of a signal which may be a phase shift or temporal dispersion causing output errors during the recovery of the data) of RTP media packets, thereby considerably interfering with the quality of the call if the size of the jitter buffers of the terminals 1a, 1b is not correctly adapted.

The present method is clearly not limited to any particular descriptive parameter (or combination thereof).

Example of Mobile Networks

In the example of a mobile communications network shown in FIG. 1b, when the first terminal 1a is put into operation with 4G radio coverage, the IMS APN ("Access Point Name") is established by default by the network 22. This APN is used to transport the SIP call signaling between the terminal and the network core IMS. An IMS APN "default bearer" is created.

This IMS APN "default bearer" has, for example, a QoS (for Quality of Service) defined by a QCI ("QoS Class Identifier") parameter, the value of which is 5 on a scale from 1 to 9. A value of this type corresponds to a transmission mode in which the authorized IP packet loss is limited, and the packets are associated with a high priority.

According to the particular embodiment described here, the terminal 1a is connected to the mobile communications network 22; the terminal 1b is connected to the communications network 20, which may be a fixed or mobile communications network.

When the terminal 1a transmits a request to set up an audio/videophone call to the terminal 1b shown in FIG. 2b, the P-CSCF informs the PCRF of a media resource reservation request according to the codec negotiated by the STP protocol encapsulated in the SIP protocol.

Following the step of receiving a media resource reservation request, in a known manner:
 the PCRF submits a resource reservation request, following various checks, to the PCEF
 the PCEF transfers the request to the PGW,
 the PGW transfers the request to the SGW,
 the SGW transfers the request to the MME,
 the MME transfers the request to the eNodeB. Thus, in addition to the "default bearer" transporting the SIP signaling, one or more "dedicated bearers" having different QCI values are established for the transfer of the media stream(s). For example, a "dedicated bearer" is established with a QCI of 1 for audio. A value of this type corresponds to a maximum authorized IP packet loss rate of 1%, a maximum delay of 30 ms between the terminal 1a and the PGW, and a highest priority associated with the transmission of the media streams. The transmission of the media streams of an audio or videophone call takes priority over the remainder of the data traffic of the terminals attached to the same radio cell.

In the SDP descriptive parameters included in the request to set up the call SIP INVITE and in the response SIP 183/200 OK to such a request, bandwidth parameters are supplied and in addition to the codecs.

For example, when the wideband AMR WB codec is negotiated in the SDP protocol encapsulated in the SIP protocol, the bandwidth necessary for access for a media stream coded according to this codec is indicated in the request to set up the call, with the parameter "b:AS:41 (kbit/s)".

A bandwidth value of this type necessary for transporting the codec and the RTP encapsulation is inserted by the network terminals and devices into the SDP offer.

This information is forwarded, following numerous checks performed by the PCRF, to the eNodeB which will reserve radio resources dedicated to the call that is to be set up.

If this value is too low, the quality of the call will be degraded. If, on the other hand, this value is too high, resources will be reserved unnecessarily.

Thus, according to one particular embodiment of the invention, when the application server 3 receives the call set-up request (message INVITE(FROM=A, To=B, SDP IMSA=G722, G711, G729) sent by 21 to 3 in FIG. 3b), the application server 3 interrogates the verification server 4 ("Detection Point (No.A, No.B, service FAF)" shown in FIG. 3b) in order to determine whether a degraded mode must be activated in order to set up the call.

The verification server 4 determines, on the basis of the identifier of the terminal A and the information included in the identifier database, whether the degraded mode must be activated. For example, the degraded mode must be activated if the number of calls transmitted by the terminal A to a premium-rate service is greater than a predetermined threshold, or if the authorized call threshold has been reached. According to another example, the degraded mode must be activated if the duration of the calls transmitted by the terminal A is greater than a predetermined maximum duration.

The verification server 4 replies to the application server 3 ("Continue with the degraded mode" message in FIG. 3b) by indicating whether or not the degraded mode must be activated. If the degraded mode is activated, the application server 3 modifies an initial descriptive parameter of the request to set up the call. For example, the application server 3 modifies the "b:AS" parameter of the SDP offer. The initial value of such a parameter is then reduced. The quality of the call will thus be degraded, since the bandwidth necessary for radio access will not be sufficient even if the QCI=1 is still used.

According to other variants, the application server 3 can modify a different initial descriptive parameter of the set-up request alone or in combination with other descriptive parameters.

According to another particular embodiment of the invention, the solution consisting in using a QCI other than 1 when the call threshold is reached is also possible. In this case, the check is performed by the PCRF equipment.

Figure 2:
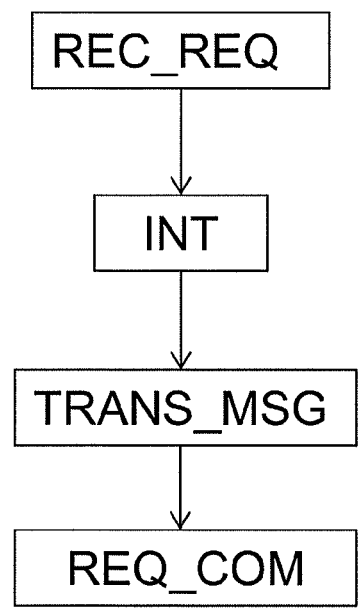
FIG. 2 shows the control method according to one particular embodiment of the invention.

When the terminal 1a transmits an audio or videophone call request to the terminal 1b, for example in the form of an SIP INVITE message, the server P-CSCF sends a respective resource reservation request to the server PCRF with a view to setting up the requested call via these resources during step REC_REQ shown in FIG. 2, the server PCRF receives a media resource reservation request from the P-CSCF. The resource reservation request includes an identifier of the terminal 1a having initiated the call, and the parameters of the SDP offer included in the call set-up request transmitted by the terminal 1a. Parameters of this type are initial descriptive parameters of the call that is to be set up. The identifier of the terminal 1a is, for example, the IMSI number (for International Mobile Subscriber Identity) of this terminal.

During step INT shown in FIG. 2, the server PCRF interrogates an identifier database in order to determine whether a degraded mode of the call must be activated. According to this particular embodiment of the invention, the identifier database is included in the server PCRF. The server PCRF determines, on the basis of the identifier of the terminal 1a and the information included in the identifier database, whether the degraded mode must be activated. The server PCRF constantly monitors the VoIP phone call sessions from the setting up of a call session until the end of the call session that has been set up; it therefore has information in the identifier database relating to a calling terminal, such as the duration of calls or the number of transmitted calls.

For example, the degraded mode must be activated if the number of calls transmitted by the terminal 1a to a premium-rate service is greater than a predetermined threshold, or if the authorized call threshold has been reached. According to another example, the degraded mode must be activated if the duration of the calls transmitted by the terminal 1a is greater than a predetermined maximum duration.
 and
According to a first variant of this particular embodiment of the invention, when the PCRF detects that the maximum duration of a call that has been set up is reached, for example 3 hours, the PCRF modifies the quality of the call in progress. The caller is thus prompted to hang up in order to release the resources of the radio cell that are used. The quality of the call is modified, for example by reducing the value of the QCI allocated to the call that has been set up. The modified QCI value is then transmitted to the server P-CSCF during step TRANS_MSG shown in FIG. 2. The server P-CSCF transmits the modified QCI value to the other servers of the mobile communications network 22.

According to a second variant, the PCRF has the number of the called terminal 1b. According to this second variant, the PCRF degrades the quality of the call that is to be set up or the quality of the call in progress by modifying an initial descriptive parameter. For example, the value of the bandwidth parameter "b:AS" is reduced. During step TRANS_MSG shown in FIG. 2, the PCRF notifies the server P-CSCF of a modification of the initial descriptive parameter.

When the call between the terminal 1a and the terminal 1b has not yet been set up, the server P-CSCF sends, during step REQ_COM shown in FIG. 2, the call set-up request SIP INVITE, including the modified descriptive parameter, to the called terminal in order to set up the call in a degraded manner.

When the call between the terminal 1a and the terminal 1b is already set up, the server P-CSCF re-negotiates the parameters of the call session to the calling terminal and the called terminal via the transmission of an SIP Re-Invite message to the calling terminal 1a and to the called terminal 1b, sent during step REQ_COM shown in FIG. 2. A message of this type includes the descriptive parameter modified by the PCRF.

According to other variants, the PCRF can apply call degradation rules, taking into account:
  the location of the calling terminal 1a, for example if the calling terminal 1a is connected via the network of its operator, this connection being referred to as "Home", or if the calling terminal 1a is connected via the network of another operator, this connection being referred to as "Roaming out", or
  the access connectivity type, for example if the calling terminal 1a is connected via a 3GPP access such as 3G, 4G, 5G, or if the calling terminal 1a is connected via a non-3GPP access, such as Wifi.

Server

According to a second aspect, the invention relates to a server for carrying out the method according to the first aspect, which is the control of a phone call initiated by a first terminal 1a connected to a communications network 20 via the operator network 21.

As explained, this server belongs to an operator network 21, for example an IMS network, which is connected to a communications network 20, for example a circuit network, via a gateway 2.

The server 3 includes a data processing module, such as a processor configured to:
  receive a request to set up a phone call between the first terminal 1a and the second terminal 1b, said request including at least one identifier of the first terminal 1a and at least one initial descriptive parameter of said phone call;
  interrogate an identifier database according to the identifier of the first terminal 1a in such a way as to determine whether a degraded call mode must be activated;
  If the degraded call mode is activated:
    modify the initial descriptive parameter,
    transmit a message including the modified descriptive parameter, said message being intended to set up the phone call via the communications network (20) or to modify the phone call in progress between the first terminal and the second terminal, the modified descriptive parameter representing a degraded call quality compared with the initial descriptive parameter.

According to a first embodiment, the server is an application server 3 and is connected (via an IM-SSF, http or LDAP interface) to the verification server 4. The verification server 4 stores the database and performs the test to know whether the degraded mode must be activated.

Alternatively, the server 3 itself includes a data storage module, such as a memory, for example a hard disk, storing said identifier database. The server 3 then performs the test to know whether the degraded mode must be activated.

According to another particular embodiment of the invention, the control method is carried out by the server PCRF of the mobile communications network 22 shown in FIG. 1b. A server PCRF of this type includes a data processing module such as a processor configured to:
  receive a request to set up a phone call between the first terminal 1a and the second terminal 1b, said request including at least one identifier of the first terminal 1a and at least one initial descriptive parameter of said phone call;
  interrogate an identifier database according to the identifier of the first terminal 1a in such a way as to determine whether a degraded call mode must be activated;
  if the degraded call mode is activated:
    modify the initial descriptive parameter,
    transmit a message including the modified descriptive parameter, said message being intended to set up the phone call via the communications network (20) or to modify the phone call in progress between the first terminal and the second terminal, the modified descriptive parameter representing a degraded call quality compared with the initial descriptive parameter.

Computer Program Product

According to a third and a fourth aspect, the invention relates to a computer program product including code instructions for carrying out, in particular on processing means of the server 3, a method according to the second aspect of the invention for controlling a phone call initiated by a first terminal 1a connected to a communications network 20 via an operator network 21, and also computer-readable storage means, for example a memory of the server 3, on which this computer program product is present.

The invention claimed is:
1. A method for controlling a phone call initiated by a first communication terminal connected to a communications network via an operator network, the method comprising, by a server of the operator network:
  receiving a request to set up a phone call between the first communication terminal and a second communication terminal, the request including an identifier of the first terminal, an identifier of the second terminal and at least one initial descriptive parameter of the phone call;
  determining whether a degraded call mode is to be activated via an interrogation of an identifier database according to the identifier of the first terminal and the identifier of the second terminal; and
  when the degraded call mode is to be activated, modifying the initial descriptive parameter, and transmitting a message to a management server of the operator network, the message including the modified descriptive parameter and being intended to set up the phone call via the communication network or to modify the phone call in progress between the first terminal and the second terminal, the modified descriptive parameter representing a degraded call quality compared with the initial descriptive parameter.

2. The method of claim 1, wherein the request to set up a phone call is a request to reserve resources in order to set up the call between the first terminal and the second terminal.

3. The method of claim 1, wherein the request to set up a phone call is a request to set up a phone call transmitted by the first terminal.

4. The method of claim 1, wherein determining whether a degraded call mode is to be activated is carried out only when the identifier of the second terminal belongs to a list of called identifiers to be monitored included in the server of the operator network.

5. The method of claim 1, wherein the degraded call mode is activated only when a call threshold associated with the identifier of the first terminal in the identifier database is reached or if a predetermined call duration is reached.

6. The method of claim 3, wherein the identifier database is that of a verification server, wherein determining whether a degraded call mode is to be activated comprises:
transmitting an auxiliary request intended for the verification server, the request including the identifier of the first terminal and the identifier of the second terminal, and
receiving a response to the auxiliary request indicating whether the degraded call mode is to be activated.

7. The method of claim 2, wherein the server of the operator network is a call quality management server and the descriptive parameter represents a quality class value allocated to the communication service by the call quality management server.

8. The method of claim 1, wherein the initial descriptive parameter represents an audio or video codec for implementing the phone call, and wherein the modified descriptive parameter represents an audio or video codec offering a call quality inferior to the call quality offered by the audio or video codec represented by the initial descriptive parameter quality.

9. The method of claim 1 wherein the modified descriptive parameter represents:
an increased frame length compared with an initial frame length, or
an activated silence detector mode, or
an activated half-duplex mode, or
an address designating a media server via which the call is to be routed, the media server being configured to apply at least one processing operation degrading the call.

10. A server of a network operator configured to control a phone call initiated by a first communication terminal connected to a communications network via the operator network, the server configured to:
receive a request to set up a phone call between the first communication terminal and a second communication terminal, the request including an identifier of the first terminal, an identifier of the second terminal and at least one initial descriptive parameter of the phone call;
interrogate an identifier database according to the identifier of the first terminal and the identifier of the second terminal to determine whether a degraded call mode is to be activated; and
when the degraded call mode is to be activated, modify the initial descriptive parameter, and transmit a message to a management server (P-CSCF) of the operator network (21), the message including the modified descriptive parameter and being intended to set up the phone call via the communications network or to modify the phone call in progress between the first terminal and the second terminal, the modified descriptive parameter representing a degraded call quality compared with the initial descriptive parameter.

11. The server of claim 10, further comprising a data storage module storing the identifier database.

12. A computer having stored thereon instructions, which when executed by the computer, cause the computer to perform the method of claim 1.

13. A non-transitory computer-readable storage medium having stored thereon instructions which, when executed by a processor, cause the processor to perform a method for controlling a phone call initiated by a first communication terminal connected to a communication network via an operator network, the method comprising:
receiving a request to set up a phone call between the first communication terminal and a second communication terminal, the request including an identifier of the first terminal, an identifier of the second terminal and at least one initial descriptive parameter of the phone call;
determining whether a degraded call mode is to be activated via an interrogation of an identifier database according to the identifier of the first terminal and the identifier of the second terminal; and
when the degraded call mode is to be activated, modifying the initial descriptive parameter, and transmitting a message to a management server of the operator network, message including the modified descriptive parameter and being intended to set up the phone call via the communication network or to modify the phone call in progress between the first terminal and the second terminal, the modified descriptive parameter representing a degraded call quality compared with the initial descriptive parameter.

* * * * *